US008165115B2

(12) United States Patent
Choi et al.

(10) Patent No.: US 8,165,115 B2
(45) Date of Patent: Apr. 24, 2012

(54) SYSTEM FOR SWITCHING VARIABLE-LENGTH DATA PACKETS OF HETEROGENEOUS NETWORK AND METHOD FOR THE SAME

(75) Inventors: Kwang Soon Choi, Yongin-si (KR); Young Choong Park, Seoul (KR); Yang Keun Ahn, Seongnam-si (KR); Kwang Mo Jung, Yongin-si (KR)

(73) Assignee: Korea Electronics Technology Institute (KR)

( * ) Notice: Subject to any disclaimer, the term of this patent is extended or adjusted under 35 U.S.C. 154(b) by 1112 days.

(21) Appl. No.: 11/617,181

(22) Filed: Dec. 28, 2006

(65) Prior Publication Data

US 2007/0147386 A1  Jun. 28, 2007

(30) Foreign Application Priority Data

Dec. 28, 2005 (KR) .................. 10-2005-0132322

(51) Int. Cl.
*H04L 12/28* (2006.01)
(52) U.S. Cl. .................. 370/389; 710/316; 379/242
(58) Field of Classification Search .................. 370/389, 370/466, 360, 422; 709/231, 223
See application file for complete search history.

(56) References Cited

U.S. PATENT DOCUMENTS

| 6,775,274 | B1 * | 8/2004 | Ain et al. ................ 370/360 |
| 2002/0085578 | A1 * | 7/2002 | Dell et al. ............... 370/422 |
| 2004/0030766 | A1 * | 2/2004 | Witkowski ............... 709/223 |
| 2004/0184479 | A1 * | 9/2004 | Yamauchi et al. ........ 370/466 |
| 2005/0276278 | A1 * | 12/2005 | Jung et al. ................ 370/466 |
| 2006/0002385 | A1 * | 1/2006 | Johnsen et al. .......... 370/389 |
| 2006/0053229 | A1 | 3/2006 | Choi et al. |
| 2007/0067481 | A1 * | 3/2007 | Sharma et al. ........... 709/231 |

* cited by examiner

*Primary Examiner* — Dang Ton
*Assistant Examiner* — Lionel Preval
(74) *Attorney, Agent, or Firm* — Thomas, Kayden, Horstemeyer & Risley, LLP.

(57) ABSTRACT

Disclosed is a system for data-switching variable-length packets of a heterogeneous network which includes: at least two switching interface modules connected to at least two networks respectively to transceive packets; a switching chip for receiving the packets from a first switching interface module among the at least two switching interface modules and for switching the received packets to a second switching interface module among the at least two switching interface modules; a SERDES (serialization and deserialization) channel for transmitting the packets between the switching interface module and the switching chip; and a signaling channel for transmitting a port number between the switching interface module and the switching chip.

14 Claims, 6 Drawing Sheets

Fig.4

| Port Number (BIN) | Network Setting Value (BIN) |
|---|---|
| 000 | 1111 |
| 001 | 1001 |
| 010 | 0000 |
| 011 | 1000 |
| 100 | 0101 |
| 101 | 1100 |
| 110 | 0011 |
| 111 | 1010 |

Fig.5

| Network Setting Value (BIN) | Port Number (BIN) |
|---|---|
| 0000 | 010 |
| 0001 | N/A |
| 0010 | N/A |
| 0011 | 110 |
| 0100 | N/A |
| 0101 | 100 |
| 0110 | N/A |
| 0111 | N/A |
| 1000 | 011 |
| 1001 | 001 |
| 1010 | 111 |
| 1011 | N/A |
| 1100 | 101 |
| 1101 | N/A |
| 1110 | N/A |
| 1111 | 000 |

SYSTEM FOR SWITCHING VARIABLE-LENGTH DATA PACKETS OF HETEROGENEOUS NETWORK AND METHOD FOR THE SAME

BACKGROUND OF THE INVENTION

1. Field of the Invention

The present invention relates to a system for switching variable-length data packets of a heterogeneous network and a method for the same; and, more particularly, to a switching of variable-length data packets of a heterogeneous network through a serial communication between switching chips to switch the packets with a switching interface module having a network value representing a type of a specific network and a port number of a port which is connected to itself.

2. Background of the Related Art

These days, various kinds of network protocols such as Ethernet, wireless LAN, IEEE1394, PLC, ZigBee, UWB, Bluetooth, etc. are in use as a home network environment, and from now on, new network technology will be used as a new home network environment.

In these environments, a home gateway needs a data switching for mutual data communication between heterogeneous networks as well as the home gateway is able to accommodate various kinds of networks. Also, as home entertainment, audio, video, broadcasting and communication are merged in a home network service, a high speed data processing and a high speed switching method are needed.

Therefore, a switching method for switching data of heterogeneous network which is applicable to the home gateway for the home network environment and service and a for the chip structure based on the switching method are required to be developed.

In case of the home gateway in the prior art, the switching technique using an Ethernet switching chip or an IP switching chip and the data switching method using the PCI bus based on PC have been mainly used.

First, the switching technique using an Ethernet switching chip is mainly used in realizing the home gateway based on Ethernet as a switching method using an address of Data Link Layer which is the Layer 2 in the OSI-7 hierarchy structure by L2 switching method.

In case of another prior art, in realizing the home gateway using an Ethernet switching chip, Ethernet addresses are assigned to each network interface and the Ethernet header is encapsulated to the heterogeneous network data incoming to the home gateway, so the Ethernet data seems to be switched inside of the home gateway.

And the switching technique using the IP switching chip is similar to the Ethernet switching technique; however, as it is a method for switching the input data inputted to the home gateway by using the IP address as a Layer 3 address, the method is frequently used in home gateway for the IP service only, such as Internet.

A data switching method using a PCI bus is commonly used as a data transmitting method using a BUS, rather than as a switching method.

However, as the switching technique using an Ethernet switching chip and an IP switching chip is mainly used for the IP based services in the home network environment, it is not suitable to accommodate various network protocols.

Also, in processing input data into the switching chip, as data is processed (in case the input data size into the switching chip is smaller than the packet unit size which the switching chip processes, null data padding is performed) into a specific bite size (the maximum Ethernet packet size or IP packet size), the memory resources inside of the switching chip is used inefficiently as well as extra data processing time are needed. The reason for the above process is the difficulty in memory management in data writing and reading of the variable-length data packet inside of the switching chip.

Due to reasons mentioned above, in the home network environment where various network protocols exists as the address structures in use are different from protocol to protocol as well as the data length is variable, it is difficult to apply to the home gateway using the existing switching chip.

SUMMARY OF THE INVENTION

Technical Problem

The present invention has been proposed in order to overcome the above-described problems in the related art. It is, therefore, an object of the present invention to provide a switching system and a method for switching variable-length data of heterogeneous network which is applicable to a home gateway for a home network environment and a home network service.

Technical Solution

In accordance with an aspect of the present invention, there is provided a system for data-switching variable-length packets of heterogeneous network, comprising: at least two switching interface modules connected to at least two networks respectively to transceive packets; a switching chip for receiving the packets from a first switching interface module among said at least two switching interface modules and for switching the received packets by a second switching interface module among said at least two switching interface modules; a SERDES (serialization and deserialization) channel for transmitting the packets between the switching interface module and the switching chip; and a signaling channel for transmitting a port number between the switching interface module and the switching chip.

In accordance with another aspect of the present invention, there is provided a method for constructing an address table using a signaling interface, including the steps of: inquiring a port number and a network set value in constructing an address table for data-switching variable-length packets of a heterogeneous network through a communication with at least two switching interface modules which have port numbers and network set values; receiving the port numbers and network set values; and composing the port table and the network table corresponding to the received port numbers and network set values.

In accordance with another aspect of the present, there is provided a method for data-switching of variable-length packets of a heterogeneous network, including the steps of: receiving the packets from a first switching interface module among at least two switching interface modules; transmitting the received packets to a switching block; switching the transmitted packets; sending the switched packets to a second switching interface module which corresponds to the destination port numbers of the packets among at least two switching interface modules.

BRIEF DESCRIPTION OF DRAWINGS

The above and other objects and features of the present invention will become apparent from the following description of the preferred embodiments given in conjunction with the accompanying drawings, in which:

FIG. 4 is a network table in accordance with one embodiment of the present invention;

FIG. 5 is a port table in accordance with one embodiment of the present invention;

DETAILED DESCRIPTION OF THE INVENTION

Hereinafter, a preferred embodiment of the present invention will be described in detail with reference to the accompanying drawings.

Figure 1:
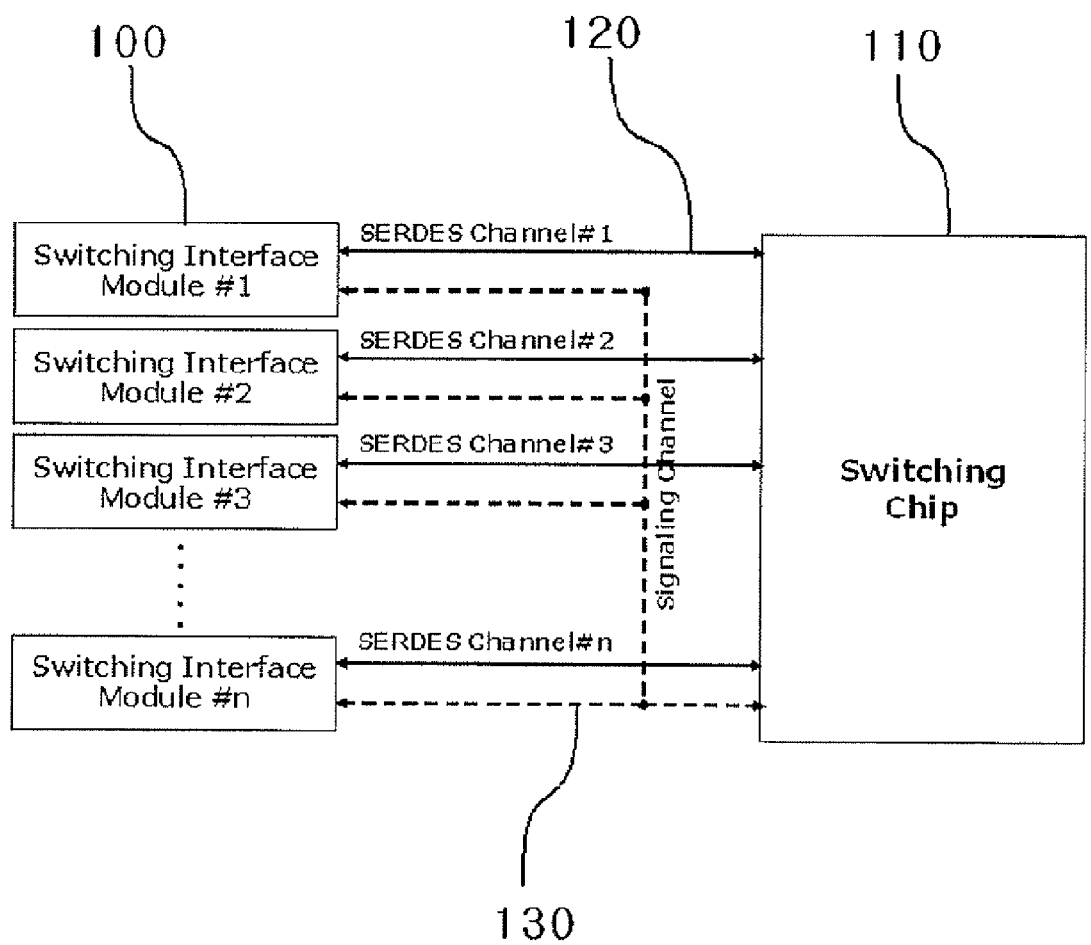
FIG. 1 is a block diagram illustrating a system for switching variable-length data packets of a heterogeneous network in accordance with one embodiment of the present invention.

FIG. 1 is a block diagram illustrating a switching system for variable-length data packets of a heterogeneous network in accordance with one embodiment of the present invention. Referring to FIG. 1, a switching system includes a switching interface module 100 for transceiving packets with a specific network and a switching chip 110 to switch packets inputted from one switching interface module to another switching interface module connected to a destination network.

Also, a SERDES (serialization and deserialization) channel 120 and a signaling channel 130 are included for data exchange between the switching interface module 100 and the switching chip 110.

After power is applied to the switching system, to exchange switching information, the switching interface module 100 sets up a switching port number to which the switching interface module 100 is connected and a network set value which is a specific value representing a type of the network which is taken in charge of the switching interface module 100. Users and system designers can define and use the network set value arbitrarily.

Also, through the signaling of the switching chip 110 and the switching interface module 100, the switching chip 110 collects information on which number of the switching port has an interface card of what kind of network, and at this time, when the switching chip 110 demands the above mentioned information, the switching interface module 100 transmits its switching port number and the network set value to the switching chip 110.

At the time of sending packets, the switching interface module 100 performs a role of giving the destination port information to the switching chip 110 so that the switching chip 110 can switch an input packet to the switching chip 110 to the destination port. Also, the switching interface module 100 performs a role of attaching size information of the packets (switching header) only to a front of the input packet to enable the switching chip 110 to store length-variable packets. In other words, it is an encapsulation of the input packet as a sort of header for switching operation.

At the time of receiving a packet, the switching interface module 100 erases the above mentioned switching header which represents the packet length in the front of the received packets from the switching chip 110 and transmits remaining packets to the destination network.

A SERDES channel 120 supports the communication between the switching interface module 100 and the switching chip 110 by using the SERDES which is a high speed serial communication protocol. At the time of communication connection, as the interface of the SERDES channel 120 is a serial communication, the physical data path between the switching interface module 100 and the switching chip 110 can be reduced.

A signaling channel 130 is a channel for the switching chip to inform the port table which manages the switching port numbers and network table which manages network set values, which are composed at the initial configuration in the switching system, to each switching interface module 100 through signaling signal and signaling data.

Figure 2:
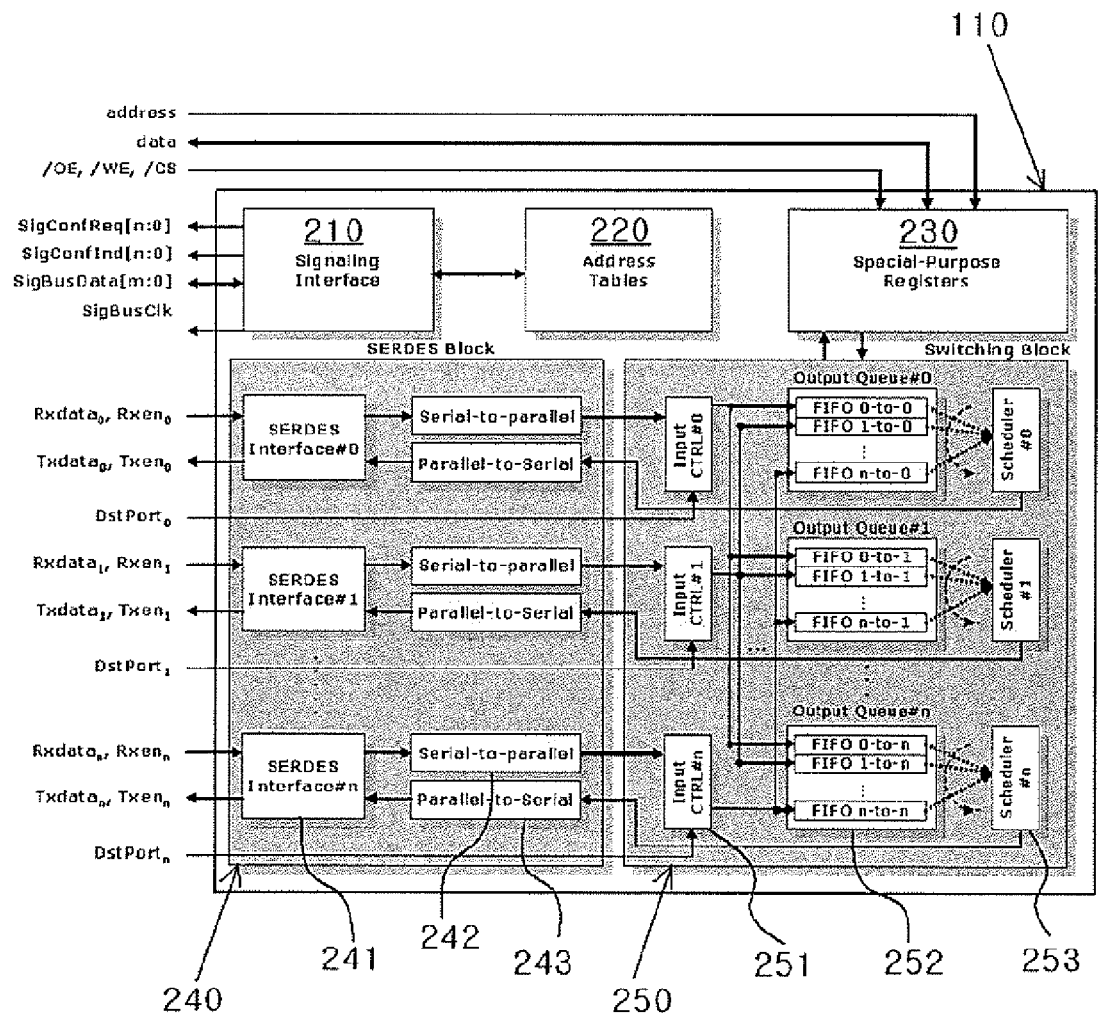
FIG. 2 is a block diagram showing a structure of a switching chip in accordance with one embodiment of the present invention.

FIG. 2 is a block diagram showing a structure of a switching chip in accordance with one embodiment of the present invention. Referring to FIG. 1 and FIG. 2, the switching chip 110 is composed of SERDES interface 241, special purpose registers 230, an address table 220, a signaling interface 210, an input controller 251, an output queue 252 which controls FIFO, and a scheduler 253 which includes an output controller.

First, as the SERDES interface 241 is an interface supporting the SERDES which is a serial communication protocol for the data communication between the switching interface module 100 and the switching chip 110, at the time of receiving data, the SERDES receives the serial data which was sent from the switching interface module 100 and converts the data into a parallel data through a first data converting block 242 and sends the data to the input controller 251, and at the time of sending data, the SERDES interface converts the parallel data which was transmitted from the output controller into a serial data through a second data converting block 243 and transmits the converted data to the switching interface module 100.

Special purpose registers 230 are a set of registers which can refer information on the present condition of the switching chip 110 and information on address tables 220, and the reference can be made through the interface with the CPU outside of the switching chip 110.

The state information of the switching chip 110 represents the number of input packets to each port, the number of output packets, and the data storage condition (full, empty, data count).

The address table 220 includes two tables, network tables composed according to ports and port table composed according to network set values.

Figure 3:
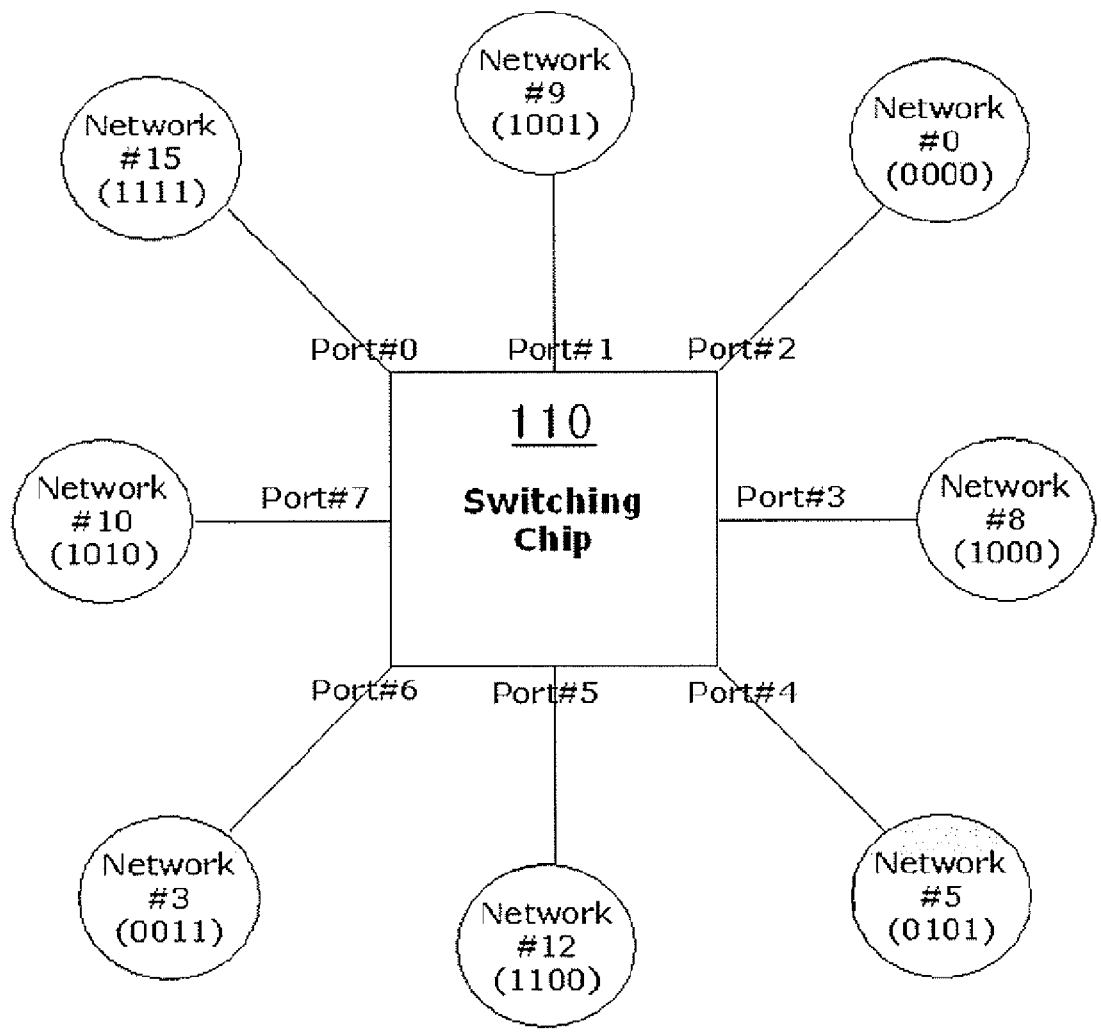
FIG. 3 is a schematic diagram representing a network configuration using the switching chip in accordance with one embodiment of the present invention.

As an embodiment of the present invention, when the number of input/output ports of the switching system using the switching chip 110 is 8 (the number of bits for representing the number of ports is 3) and the network set value defined by a user is 16 (the number of bits for representing the network set value is 4), the user car select up to 8 network interfaces out of the 16 network interfaces which the user wants and connect selected network interfaces to arbitrary ports as shown in FIG. 3.

The network table which is set up under this condition is as shown in FIG. 4, and the port table is as shown in FIG. 5.

The network table as shown in FIG. 4 uses the port number as an index when inquiring which interface is connected to a designated port, and the port table as shown in FIG. 5 is used when inquiring the designated network is connected to which port of the switching chip 110 using a network set value as an index. Besides, the N/A in the port table means that the designated network is not connected to the switching port.

Figure 6:
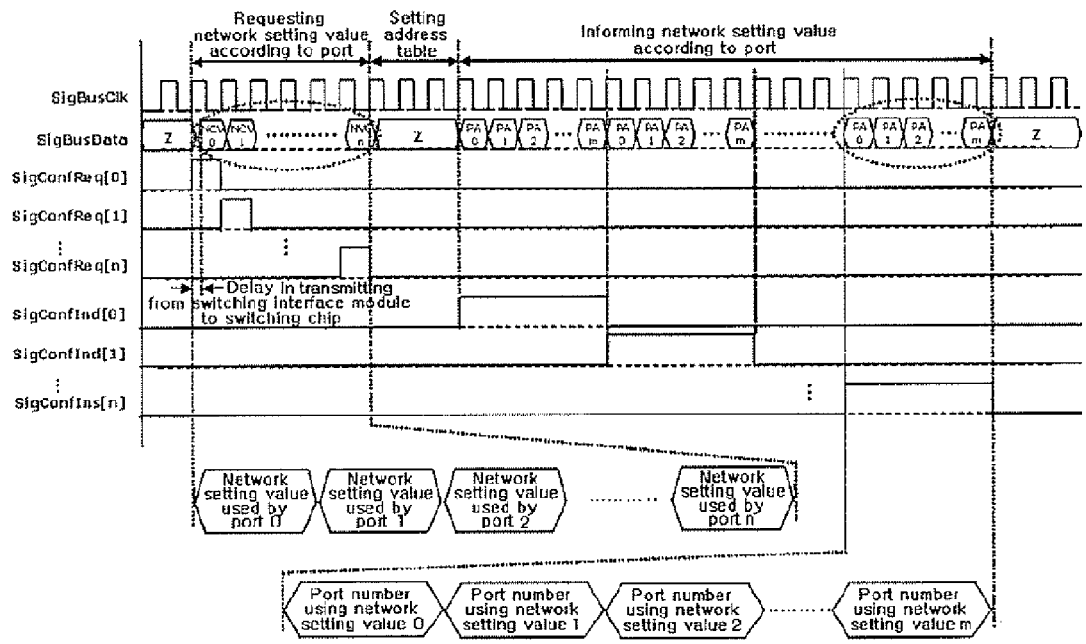
FIG. 6 is a timing operation chart of a signaling interface in accordance with one embodiment of the present invention.

FIG. 6 is a timing operation chart of a signaling interface in accordance with the embodiment of the present invention. Referring to FIG. 1 through FIG. 6, the signaling interface 210 inquires port numbers and network set values through signaling with the switching interface module 100, and gives the collected information on port numbers and network set values to all switching interface modules 100.

When there are n+1 switching ports, first, the signaling interface 210 inquires network set values to the switching interface module 100 which is connected to ports from number 0 to n in order of precedence (SigConfReq[n:0] in FIG. 2), and the switching interface module 100 informs the network set value of itself. At this time, the data communication between the switching chip 110 and the switching interface module 100 is established through the data bus for signaling (SigBusData[m:0] in FIG. 2).

After constructing a network table and a port table using network set values collected according to the ports, the port table information is informed after synchronized to the data clock for signaling through the data bus for signaling, to the switching interface module 100 of port number 0 to n in order of precedence. At this time, to inform the port table information in order of precedence, the designated port is forced to use an enable signal (SigConfInd[n:0] in FIG. 2).

As shown in above, by reporting the information that a specific network is connected to a specific port to the switching interface module 100 through the signaling interface 210, the switching interface module 100 can distinguish the designation address of the input packet to itself and switches to the network set address and send the data to the port which is assigned to the network set address.

For this, when sending the data to the SERDES channel 120, the switching chip is informed of the port number which corresponds to the destination address of the input packet.

The input controller 251 exists on each port and when the number of port is n, the n input controllers exist.

When sending packets through the SERDES interface 241 of switching chip 110, the SERDES interface 241 informs the input controller 251 of the port number of the port into which the packet should be switched. At this time, the input controller 251 relays the data to the output Queue 252 of the corresponding port using the port number which is informed from the SERDES interface 241.

Also, another role of the input controller 251 is providing the tail-drop technique of the output queue 252, by comparing the remaining data size (space for storage possibility) to the data size of the switching header of the input packet, and discarding the input packet if the remaining data size is smaller than the input packet so that the whole packet cannot be stored.

The output queue 252 exists independently on the ports so when there are n ports, n output queue 252 exist.

N independent FIFO exists on each output QUEUE 252, and FIFO N-to-M means a FIFO where a packet which is sent into the port N and switched into the port M is stored.

Figure 7:
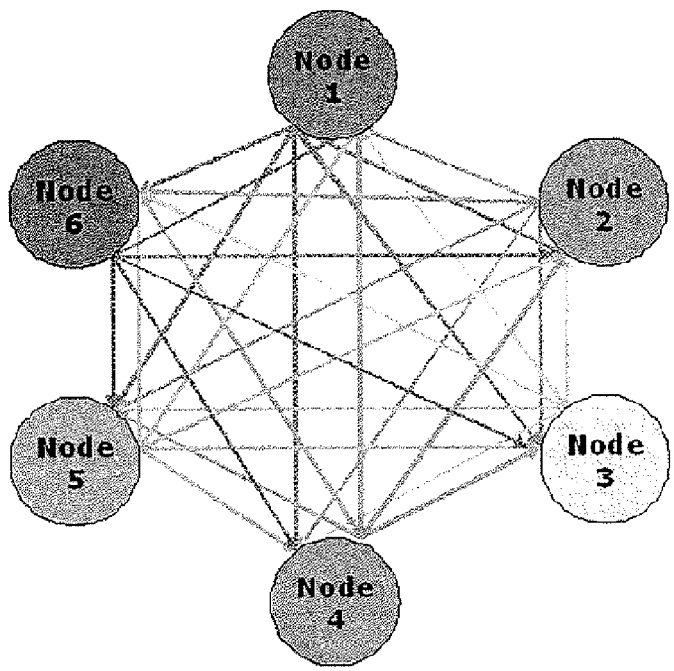
FIG. 7 is a schematic diagram representing a Full-Mesh switching method.

By constructing the output queue 252 as shown above, the packet can be switched even when packets from n ports are inputted simultaneously. Also, a switching technique of full-mesh mechanism, which is known to be able to achieve best performance, is provided as shown in FIG. 7.

When there are n ports, the scheduler 253 plays the role of outputting one by one the packets which are stored in n FIFOs through the output controller of the scheduler 253 as there are n FIFOs for one output queue 252.

The scheduler 253 can be realized to output the packets through the priority of packets which are stored in FIFO or various algorithms for FIFO management.

Figure 8:
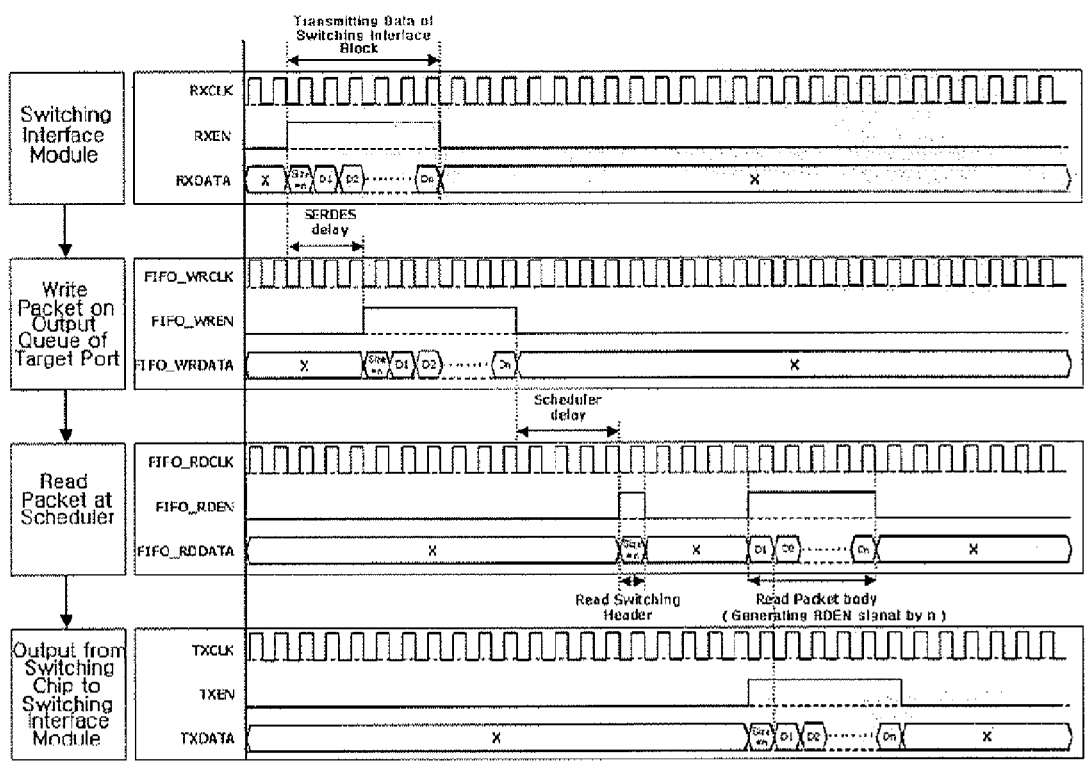
FIG. 8 is a timing operation chart depicting the read/write method of FIFO in accordance with one embodiment of the present invention.

When the scheduler 253 reads packets for outputting packets, if one FIFO is selected among n FIFOs by the scheduler 253, after reading the switching header which represents the packet size, it is possible to perform data switching by the unit of packet. FIG. 8 is a timing operation chart which represents the read/write method of FIFO in accordance with the embodiment of the present invention. Referring to FIG. 1 to FIG. 8, the switching interface module 100 loads packets for switching into the RXDATA according to the RXEN signal which is synchronized to the RXCLK, and sends the packets to the switching chip 110 through the SERDES channel. At this time, the switching interface module 100 also gives the information on the destination port also to the switching chip 110.

The clk and enable signals and data which are transmitted to the output queue 252 of the destination port are transferred directly to the WRCLK, WREN and WRDATA of the FIFO without conversion, and the FIFO performs writing operation based thereon.

When the scheduler 253 reads and outputs packets which are stored in FIFO (when reading), after generating the RDEN signal for 1 cycle period for reading the switching header, it reads packets which are stored in FIFO by generating RDEN signal by the packet size.

Packets which are read from the scheduler 253 are attached to the switching header again and sent to the switching interface module 100 of the destination port as TXCLK, TXEN and TXDATA signal through the SERDES.

Therefore, the system for switching variable-length data packets of a heterogeneous network and a method for the same in accordance with the embodiment of the present invention are capable of exchanging heterogeneous type data or heterogeneous network packets using a network set value, and by transferring a switching header which represents the length of a packet to the packet which is the object of transferring, capable of switching a variable-length packet easily, capable of writing easily by constructing the memory inside of the switching with FIFO, and capable of reading easily as the length of packet is known.

Also, the present invention is capable of providing a full-mesh style switching mechanism by storing the input packet to the switching chip according to input ports separately to construct the output queue of switching chip with the same number of FIFO to the number of ports, and by constructing and using an address table, confirmation of a specific header which has the destination port information of the packet by the switching chip is unnecessary, and is capable of switching heterogeneous network packet which has a different header structure to each other.

Also, the switching chip in accordance with the present invention can be modified easily according to the increase and reduction of the port number by providing the structure of module type which has the same structure from port to port when designing the chip.

Although certain example methods, an apparatus and articles of manufacture have been described herein, the scope of coverage of this invention is not limited thereto. On the contrary, this patent covers all methods, apparatus and articles of manufacture fairly falling within the scope of the appended claims either literally or under the doctrine of equivalents.

What is claimed is:

1. A system for data-switching variable-length packets of a heterogeneous network, comprising:
at least two switching interface modules connected to at least two networks, respectively, to transceive packets, each of the switching interface modules attaching packet size information of packets received at the respective switching interface module to the respective packets;

a switching chip that receives packets from a first switching interface module among said at a least two switching interface modules and switches the received packets to a second switching interface module among said at least two switching interface modules;

a SERDES (serialization and deserialization) channel that transmits packets between the switching interface modules and the switching chip; and a signaling channel that transmits a port number between one of the switching interface modules and the switching chip, wherein the switching chip includes:

an address table that stores a port table which correlates network set values with port numbers;

a signaling interface that transmits information in the port table to the switching interface modules;

a SERDES system that transceives packets with the switching interface modules and converts packets into parallel data; and a switching system that transmits packets to the SERDES system based on destination port numbers of the packets, wherein the switching system includes:

at least two input controllers that transmit packets to output queues corresponding to the destination port numbers of the respective packets;

at least two output queues that store packets transmitted from said input controllers; and at least two schedulers that read the packets stored in said output queues and transmit the packets to the SERDES system based on the destination port numbers of the respective packets.

2. The system as recited in claim 1, wherein each of the switching interface modules encapsulates packets received from a network to which the respective switching interface module is connected, by using data size information of the packets.

3. The system as recited in claim 1, further comprising:

a register configured to inquire state information of the switching chip.

4. system as recited in 1, wherein the SERDES system includes:

at least two SERDES interfaces that support SERDES communications respectively to tranceive the packets with the at least two switching interface modules and to receive the destination port number of the packets;

at least two first data converting systems that convert serial data transmitted from the at least two SERDES interfaces into parallel data and transmit the concerted data to the switching system; and at least two second data converting systems that convert the parallel data transmitted from the switching system into serial data and transmit the converted data to said at least two SERDES interfaces.

5. The system as recited in claim 1, wherein one of the at least two input controllers drops the packets to be stored by comparing the possible data storage size of one of the output queues and the data size of the packets to be stored when the possible data storage size is smaller than the data size of packets to be stored.

6. The system as recited in claim 1, wherein said at least two output queues possess at least two switching interface modules and at least two FIFO (first in first out) storing units.

7. The system as recited in claim 6, wherein the packets are stored at the FIFO storage unit corresponding to the input port number of the packets.

8. The system as recited in claim 1, wherein the scheduler outputs the packets from at least two FIFO storage units in packet units.

9. A method for data-switching variable length data packets of a heterogeneous network, comprising:

receiving packets from a first switching interface module among at least two switching interface modules;

attaching packet size information of the received packets to the respective packets, by the first switching interface module;

transmitting the received packets to a switching block;

switching the transmitted packets;

receiving, from the first switching interface module, a port number of a second switching interface module among the at least two switching interface modules; and transmitting the received packets to the second switching interface module, wherein switching the transmitted packets comprises:

transmitting the transmitted packets to an output queue which corresponds to a destination port number of the packets among at least two output queues;

storing the transmitted packets in a FIFO (First in first out) storage unit of the output queue which corresponds to an input port number of the packets among at least two FIFO storage units; and outputting the stored packets in packet units;

wherein the method further comprises dropping packets to be sorted by comparing the possible data storage size to the output queue and the data size to the packets to be stored when the possible storage data size is smaller than the data size of packets to be stored.

10. The method as recited in claim 9, wherein the packets are receive from the first switching interface module and transmitted to the second switching interface module through SERDES communication.

11. The method as recited in claim 9, wherein each of the switching interface modules encapsulates packets received from a network to which the respective switch interface module is connected, by using data size information of the packets.

12. The method as recited in claim 9, wherein transmitting the received packets to the switching block comprises:

converting the received packets into a parallel data; and transmitting the converted packets to the switching block.

13. The method as recited in claim 9, wherein transmitting the received packets to the second switching interface module comprises:

receiving the packets switched from the switching block;

converting the received packets into a serial data; and transmitting the converted packets to the second switching interface module through SERDES communication.

14. The system as recited in claim 1, wherein the switching interface transmits a port number of a destination switching interface module via the signaling channel.

* * * * *